(12) United States Patent
Sato (10) Patent No.: US 6,839,075 B2
(45) Date of Patent: Jan. 4, 2005

(54) IMAGE FORMING APPARATUS, AND MEMORY CONTROL METHOD FOR IMAGE FORMING APPARATUS

(75) Inventor: Isamu Sato, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/043,126

(22) Filed: Jan. 14, 2002

(65) Prior Publication Data

US 2002/0097318 A1 Jul. 25, 2002

(30) Foreign Application Priority Data

Jan. 19, 2001 (JP) .................................... 2001-012152

(51) Int. Cl.$^7$ .............................. B41J 2/47; B41J 2/435

(52) U.S. Cl. ...................................... 347/235; 347/250

(58) Field of Search ................................. 347/175, 176, 347/215, 221, 235, 250, 262, 264, 234, 248; 358/1.16, 1.2, 1.6, 1.18

(56) References Cited

U.S. PATENT DOCUMENTS

| | | | | |
|---|---|---|---|---|
| 5,546,511 A | * | 8/1996 | Kwak | 358/1.6 |
| 5,566,277 A | * | 10/1996 | Hideshima et al. | 358/1.16 |
| 5,661,512 A | * | 8/1997 | Fukuda et al. | 347/175 |
| 5,901,274 A | * | 5/1999 | Oh | 358/1.2 |
| 6,486,971 B1 | * | 11/2002 | Kawamoto | 358/1.2 |

* cited by examiner

Primary Examiner—Hai Pham
(74) Attorney, Agent, or Firm—Fitzpatrick, Cella, Harper & Scinto (57) ABSTRACT

This invention obtains an image forming apparatus and image forming method capable of achieving a simple, low-cost arrangement by controlling memory write-in/read-out similarly to image signal generation using a single beam even when an image is formed using a plurality of light beams. Write-in of a first light beam image signal in a memory A starts before a first light beam image signal for previous scanning is completely read out from the memory A. Write-in of a second light beam image signal in a memory B starts after a second light beam image signal for previous scanning is completely read out from the memory B.

4 Claims, 7 Drawing Sheets

IMAGE FORMING APPARATUS, AND MEMORY CONTROL METHOD FOR IMAGE FORMING APPARATUS

BACKGROUND OF THE INVENTION

1. Field of the Invention

The present invention relates to an image forming apparatus and image forming method using a light beam and, more particularly, to an image forming apparatus and image forming method for forming an image by a scanning optical system which uses a plurality of light beams.

2. Description of Related Art

A conventional image forming apparatus using a scanning optical system for scanning a plurality of light beams emitted by a plurality of laser sources can decrease the rotational speed (revolutions) of a polygon mirror in comparison with a scanning optical system for scanning a single laser beam, and is more advantageous in durability and vibrations.

To the contrary, an image forming apparatus using a single laser beam can almost simultaneously perform generation of an image signal and exposure by a laser beam. In the use of a plurality of laser beams, the apparatus accumulates a plurality of image signals generated every line and then executes exposure by a laser beam.

These types of the conventional image forming apparatus using a plurality of laser beams requires control of accumulating image signals generated every line. This complicates a circuit necessary to generate an image signal, and inhibits a low-cost arrangement.

SUMMARY OF THE INVENTION

The present invention has been made in consideration of the above situation and has as its object to provide an image forming apparatus and image forming method capable of achieving a simple, low-cost arrangement by controlling memory write-in/read-out similarly to image signal generation using a single beam even when an image is formed using a plurality of light beams.

One aspect of the present invention is to provide an image forming apparatus including scanning device for scanning a photosensitive member with a first light beam and a second light beam, a first memory for storing an image signal for modulating the first light beam, a second memory for storing an image signal for modulating the second light beam; and memory control means for starting writing an image signal for a first light beam in the first memory before an image signal for a first light beam for previous scanning is read out from the first memory, and starting writing an image signal for a second light beam in the second memory after an image signal for a second light beam for previous scanning is read out from the second memory.

Furthermore, another aspect of the present invention is to provide a memory write-in control method for an image forming apparatus having scanning means for scanning a photosensitive member with a first light beam and a second light beam, a first memory for storing an image signal for modulating the first light beam, and a second memory for storing an image signal for modulating the second light beam, comprising the steps of starting write-in of an image signal for a first light beam in the first memory before an image signal for a first light beam for previous scanning is read out from the first memory, and starting write-in of an image signal for a second light beam in the second memory after an image signal for a second light beams for previous scanning is read out from the second memory.

Other objects and aspects of the invention will become apparent from the following description of embodiments with reference to the accompanying drawings.

DETAILED DESCRIPTION OF THE PREFERRED EMBODIMENT

An embodiment of the present invention will be described in detail below with reference to the accompanying drawings.

Figure 1:
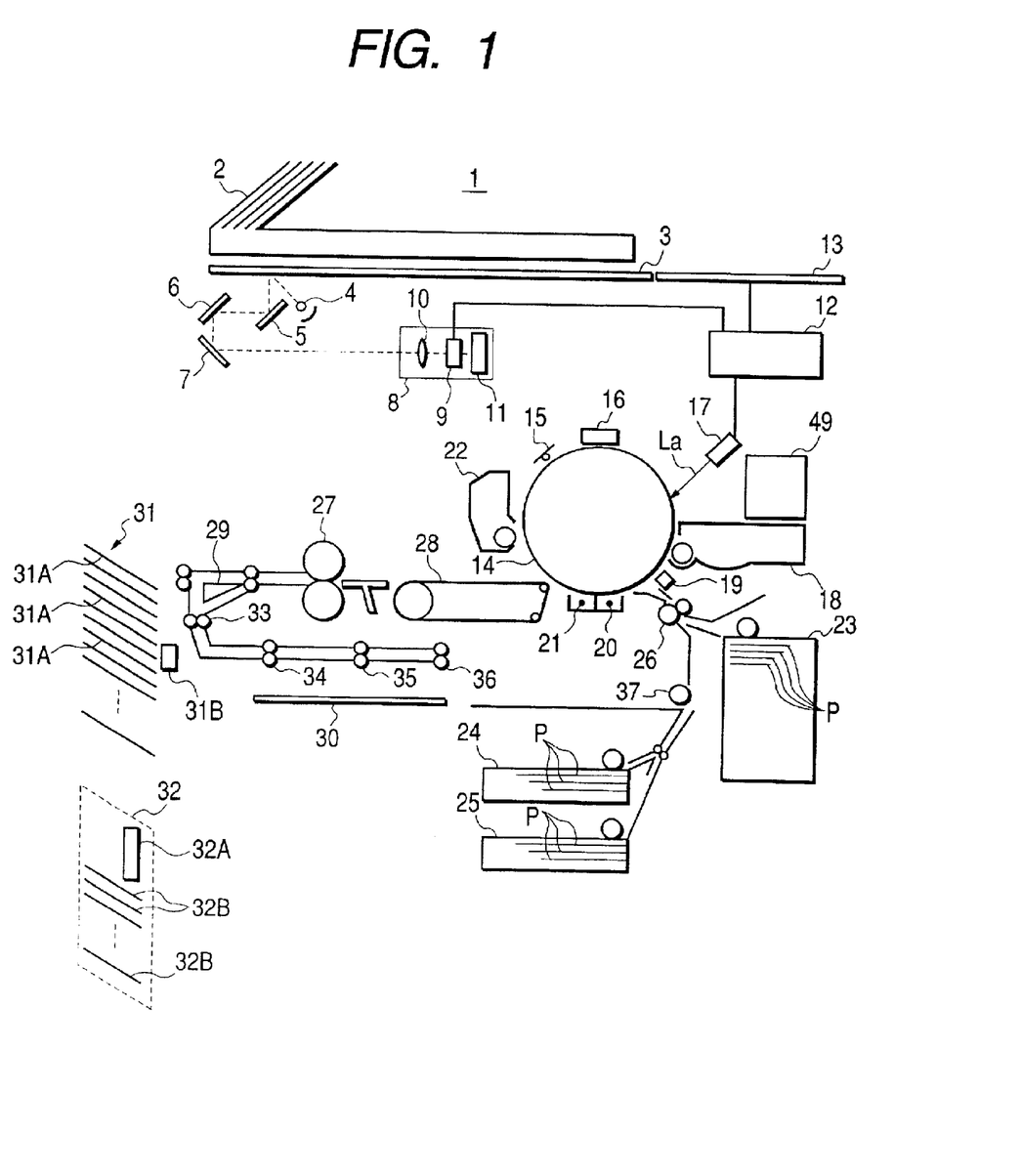
FIG. 1 is a sectional view showing the constituent arrangement of an image forming apparatus according to an embodiment of the present invention.

FIG. 1 is a sectional view showing the constituent arrangement of an image forming apparatus according to the embodiment. In FIG. 1, an image forming apparatus 1 is set such that an illumination lamp for lighting an original (hereinafter referred to as an original illumination lamp 4) formed from, e.g., a halogen lamp exposes or exposes/scans image data of an original (not shown) passing through a predetermined position of a copy board glass 3 from an automatic original feeding apparatus 2, and image data of originals (not shown) sequentially fed and set on the copy board glass 3.

The original illumination lamp 4 of the image forming apparatus 1 is held by an optical scanning unit supported by the image forming apparatus 1 freely in a direction normal to the sheet surface and the horizontal direction of the sheet surface, together with scanning mirrors 5, 6, and 7 for reflecting and changing the path of a reflected optical image obtained by exposure or exposure/scanning. The optical scanning unit repeats reciprocation in the normal direction of the sheet surface and the horizontal direction of the sheet surface to expose and scan all the current image data by the original illumination lamp 4. The obtained reflected optical image is changed in path by the scanning mirrors 5, 6, and 7, and guided to a CCD unit 8 for converting analog data into digital data.

The CCD unit 8 of the image forming apparatus 1 has an image sensing element 9 formed from, e.g., a known CCD, an imaging lens 10 for forming the obtained reflected optical image on the image sensing element 9, and a CCD driver 11 for driving, e.g., the image sensing element 9. The CCD unit 8 converts an output signal output from the image sensing element 9 in accordance with the obtained reflected optical image into corresponding digital data, e.g., 8-bit digital data, and inputs the digital data to a controller 12 of the image forming apparatus 1.

A reflected optical image obtained by exposure/scanning of the original illumination lamp 4 in the image forming apparatus 1 is formed on the image sensing element 9 in the CCD unit 8. The CCD unit 8 comprises a white plate (not shown) in order to eliminate any influence such as a longitudinal luminous intensity distribution of the original illumination lamp or sensitivity unevenness of the image sensing element 9. A surface of the white plate read by the original illumination lamp 4 is coated white. A reflected optical image on the white plate is formed on the image sensing element 9. Digital data at this time is input to the controller 12 of the image forming apparatus 1.

The image forming apparatus 1 includes a photosensitive drum 14 serving as a cylindrical or columnar latent image bearing body, a pre-exposure lamp 15 for charge-removing the outer surface of the photosensitive drum 14 for the next image formation, a primary charger 16 for charging the outer surface of the photosensitive drum 14 to a predetermined potential distribution for latent image formation, a laser unit 17 having two light sources which are formed from, e.g., known semiconductor laser sources, expose the outer surface of the photosensitive drum 14 charged by the primary charger 16 on the basis of digital data input from the controller 12, and form an electrostatic latent image corresponding to the input image data on the outer surface of the photosensitive drum 14, and a developing device 18 serving as a developing means for applying a developer (toner) to the electrostatic latent image formed on the outer surface of the photosensitive drum 14 and developing the latent image into a visualized image (toner image).

The photosensitive drum 14 of the image forming apparatus 1 is surrounded by the pre-exposure lamp 15, the primary charger 16, the developing device 18, a pre-transferring charger 19 for applying a high voltage to a visualized image on the outer surface of the photosensitive drum 14 before transfer, a transferring charger 20 for transferring the visualized image onto a recording sheet P by, e.g, known corona discharge, a separating charger 21 for separating the recording sheet P having undergone transfer processing from the outer surface of the photosensitive drum 14, and a cleaner 22 for removing and recovering the developer left on the outer surface of the photosensitive drum 14 after the end of transfer.

More specifically, a toner image formed on the outer surface of the photosensitive drum 14 receives a high voltage from the pre-transferring charger 19. A recording sheet P subjected to transfer processing is conveyed to a transfer region between the photosensitive drum 14 and the transferring charger 20 at a timing set by registration rollers 26 from any one of sheet feeding units 23, 24, and 25 which classify a plurality of recording sheets P by, e.g., sizes and store them. The recording sheet P which has reached the transfer region receives the toner image on the outer surface of the photosensitive drum 14 by, e.g., corona discharge of the transferring charger 20. Then, the recording sheet P is separated from the outer surface of the photosensitive drum 14 by the separating charger 21.

After the developer left on the outer surface is removed by the cleaner 22, the photosensitive drum 14 having undergone transfer processing prepares for the next image formation.

The image forming apparatus 1 further includes a fixing device 27 for performing fixing processing upon heat supply and pressure application, a convey belt 28 for conveying the recording sheet P bearing the toner image in the transfer region to the fixing device 27, a flapper 29, an intermediate tray 30, and either one of a staple sorter 31 and bookbinding apparatus (glue binder) 32.

The flapper 29 included in the image forming apparatus 1 conveys the recording sheet P having undergone fixing processing by the fixing device 27 to either one of the intermediate tray 30 and staple sorter 31 (bookbinding apparatus 32 when the image forming apparatus 1 has the bookbinding apparatus 32) under the control of the controller 12.

When a mode in which a plurality of images are formed on a single surface, i.e., a so-called multiple transfer mode is executed, the intermediate tray 30 of the image forming apparatus 1 conveys the recording sheet P conveyed via convey rollers 33, 34, 35, and 36 to a re-convey roller 37 without reversing face or back of the sheet. When a mode in which images are formed on the two surfaces of the recording sheet P, i.e., a so-called double-side copying mode is executed, the intermediate tray 30 reverses the recording sheet P and conveys it to the re-convey roller 37.

The re-convey roller 37 of the image forming apparatus 1 conveys the recording sheet P from the intermediate tray 30 to the registration rollers 26. The recording sheet P which has reached the registration rollers 26 is conveyed to the transfer region again and subjected to transfer processing. After that, the recording sheet P is conveyed to the fixing device 27 by the convey belt 28, subjected to fixing processing, and discharged to the staple sorter 31 or glue binder 32.

The staple sorter 31 can sort a plurality of recording sheets P having undergone fixing processing into respective bins 31A one by one when a mode in which images are successively formed on a plurality of recording sheets P, i.e., a so-called successive copying mode is executed. If the staple sorter 31 is attached to the image forming apparatus 1, a staple portion 31B staples under the control of the controller 12.

The glue binder 32 can bind a plurality of recording sheets P having undergone fixing processing. When the glue binder 32 is attached to the image forming apparatus 1, a binder portion 32A binds a bundle of recording sheets P having undergone fixing processing by sizing a spine, and stacks them on a stacker 32B.

Figure 2:
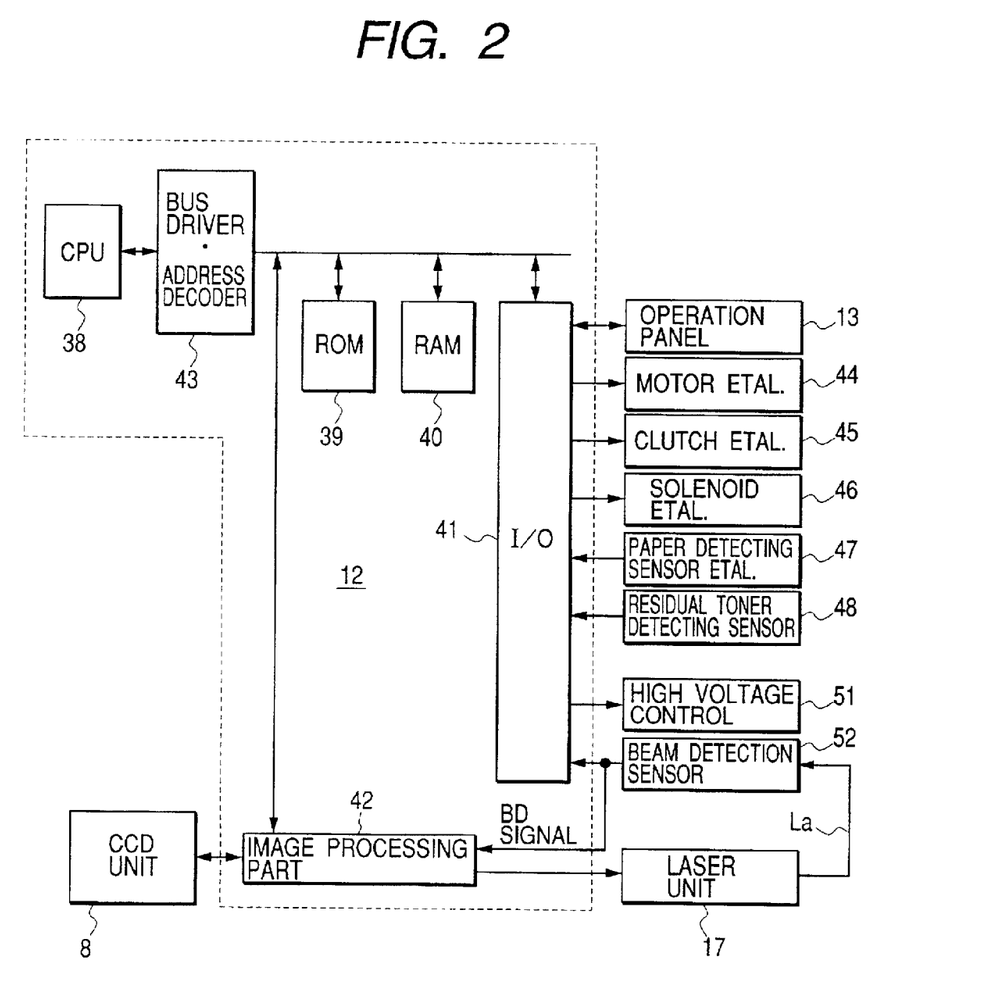
FIG. 2 is a block diagram showing the electrical arrangement of a controller 12 in the image forming apparatus shown in FIG. 1.

The controller 12 of the image forming apparatus 1 will be explained with reference to FIG. 2. FIG. 2 is a block diagram showing the detailed arrangement of the controller 12.

The controller 12 controls the whole image forming apparatus, and processes digital data input from the CCD unit 8 in accordance with manual operation of an operation panel 13 by the user. The controller 12 has a CPU 38 for mainly controlling the overall image forming apparatus, a ROM 39 which stores in advance the control procedures (control programs) of the overall apparatus and the like, a RAM 40 serving as a main storage device used for storage of input data or as a work storage area, an I/O port 41 serving as an interface between units, and an image processing part 42 for processing digital data input from the CCD unit 8 on the basis of manual operation of the operation panel 13 by the user.

The address bus and data bus (neither is shown) of the CPU 38 in the controller 12 are connected to the ROM 39, RAM 40, I/O port 41, and image processing part 42 via a bus driver/address decoder circuit 43.

The I/O port 41 of the controller 12 is connected to the operation panel 13, a motor et al. 44, electromagnetic clutch et al. 45, and electromagnetic solenoid et al. 46 for driving main units such as a motor for driving the optical scanning unit of the image forming apparatus 1, a paper detecting sensor et al. 47 for detecting, e.g., a recording sheet P conveyed to the transfer region, a residual toner detecting sensor 48 for detecting the amount of toner remaining in the developing device 18, a high-voltage unit 51 for outputting a high voltage to the primary charger 16, pre-transferring charger 19, transferring charger 20, and separating charger 21, and a beam detection sensor 52 disposed in a non-image region on the outer surface of the photosensitive drum 14 to receive a laser beam La emitted by the laser unit 17.

Figure 3:
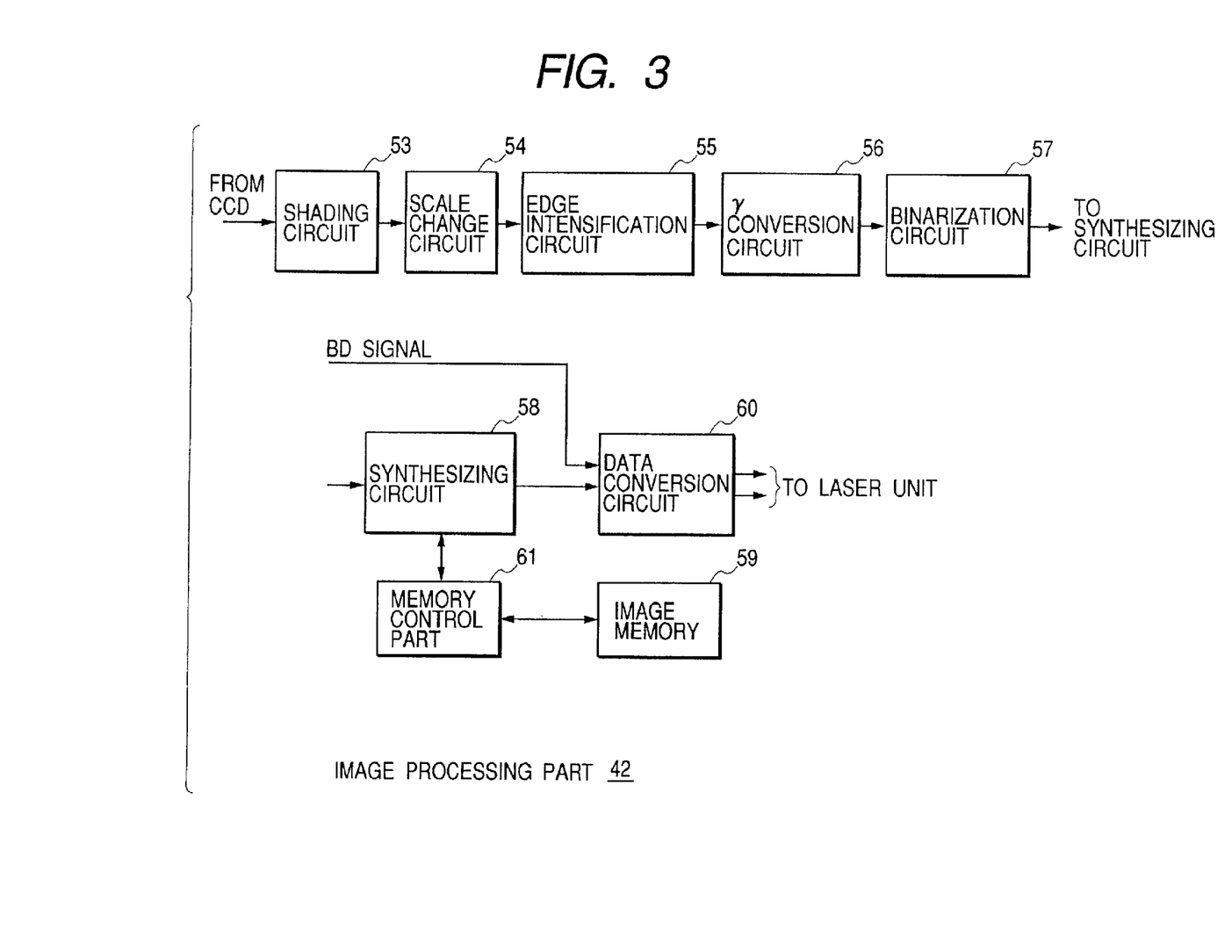
FIG. 3 is a block diagram showing the detailed arrangement of an image processing part 42 shown in FIG. 2.

The image processing part 42 of the controller 12 will be explained with reference to FIG. 3. FIG. 3 is a block diagram showing the detailed arrangement of the image processing part 42.

In the image processing part 42, the CCD unit 8 converts analog data into digital data, and a shading circuit 53 corrects variations between pixels. If a mode in which an image is formed on the recording sheet P by a scale change circuit 54 is a reduction copying mode, the scale change circuit 54 decimates the digital data; and if the mode in which an image is formed on the recording sheet P is an enlargement copying mode, the scale change circuit 54 interpolates the digital data. The shading circuit 53 outputs an error signal to the I/O port 41.

The digital data having undergone decimation processing or interpolation processing by the scale change circuit 54 is subjected to image edge emphasis by an edge emphasis circuit 55 by performing, e.g., quadratic differential in a 5×5 window.

The digital data edge-emphasized by the edge emphasis circuit 55 is brightness data, which must be converted into density data in order to output digital data to the laser unit 17. After the brightness data is converted into density data by table search of a γ conversion circuit 56, the data is input to a binarization circuit 57 in order to change the tone expression such as an intermediate density in accordance with a mode in which an image is formed on the recording sheet P.

The digital data input to the binarization circuit 57 is only the density data converted from the brightness data by the γ conversion circuit 56, and is still multivalued data, which must be converted into binary data. Thus, the multivalued data is converted into binary data by, e.g., a known ED method, and input to a synthesizing circuit 58.

The synthesizing circuit 58 in which the digital data is input outputs the input digital data and image data in an image memory 59 formed from, e.g., a DRAM to a data conversion circuit 60 selectively or as a result of OR. Read/write control to the image memory 59 is done by a memory control part 61.

The digital data input to the data conversion circuit 60 has a pulse corresponding to an image formation mode set based on manual operation of the operation panel 13 by the user. The data conversion circuit 60 generates digital data so as to correspond to each light source of the laser unit 17, and outputs it to the laser unit 17.

Figure 4:
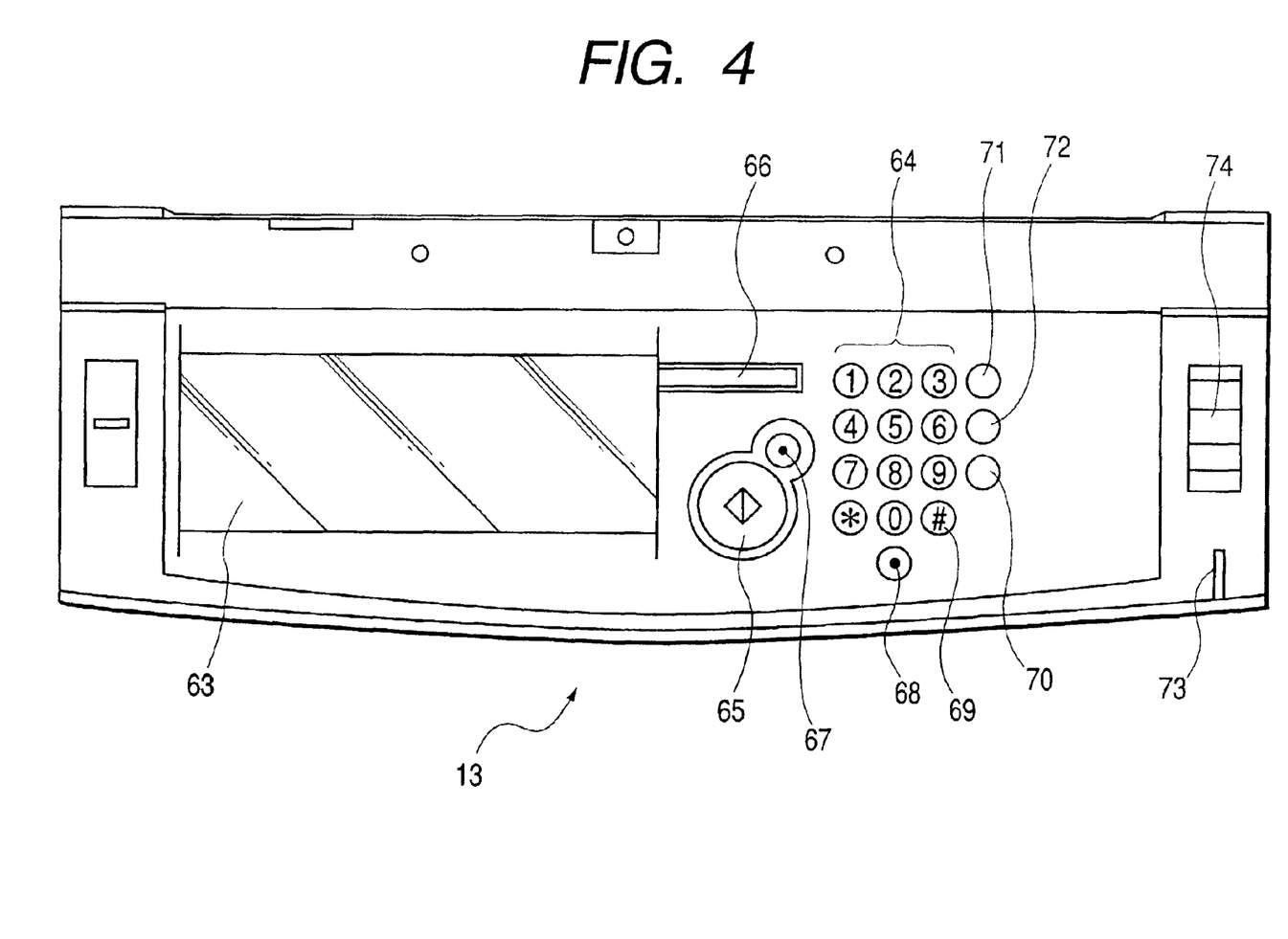
FIG. 4 is a plan view showing an operation panel 13 in the image forming apparatus shown in FIG. 1.

The operation panel 13 of the image forming apparatus 1 will be described with reference to FIG. 4. FIG. 4 is a plan view showing the detailed arrangement of the operation panel 13.

The operation panel 13 designates image processing of the controller 12 when the user sets transfer and fixing modes, the number of recording sheets P serving as a sheet-like transferring material used to form an image, or the density of an image to be formed on the recording sheet P.

The operation panel 13 adopts a known touch panel form. The operation panel 13 has a display portion 63 serving as a display means, ten-key pad 64, start key 65, reset key 66, stop key 67, clear key 68, # key 69, ID key 70, heat inertia key 71, interrupt key 72, power display lamp 73, and power switch 74.

The display portion 63 of the operation panel 13 can display an instruction to the user by a message or the like. The ten-key pad 64 allows the user to input the number of copies or the like. The start key 65 instructs the image forming apparatus 1 to start image formation. The reset key 66 resets settings of the mode and the like to default settings. The stop key 67 suspends all the operations of the image forming apparatus 1. The clear key 68 clears the number of copies input via the ten-key pad 64 to a default setting value. The # key 69 is used by an option accessory to the image forming apparatus 1. The ID key 70 has a function which permits only a specific user to operate the image forming apparatus 1, i.e., a so-called ID mechanism. The heat inertia key 71 switches a heat inertia mode ON/OFF state. The interrupt key 72 interrupts copying operation to form another image. The power display lamp 73 notifies the user by "light" that the image forming apparatus 1 is not powered on.

When the image forming apparatus 1 is OFF, the power switch 74 of the operation panel 13 turns on a DC power supply (not shown) and a secondary circuit (not shown) connected to the DC power supply, and turns off a primary circuit (not shown) connected to the DC power supply and the display portion 63. When the image forming apparatus 1 is ON, the power switch 74 turns on all the DC power supply, primary circuit, secondary circuit, and display portion 63.

Figure 5:
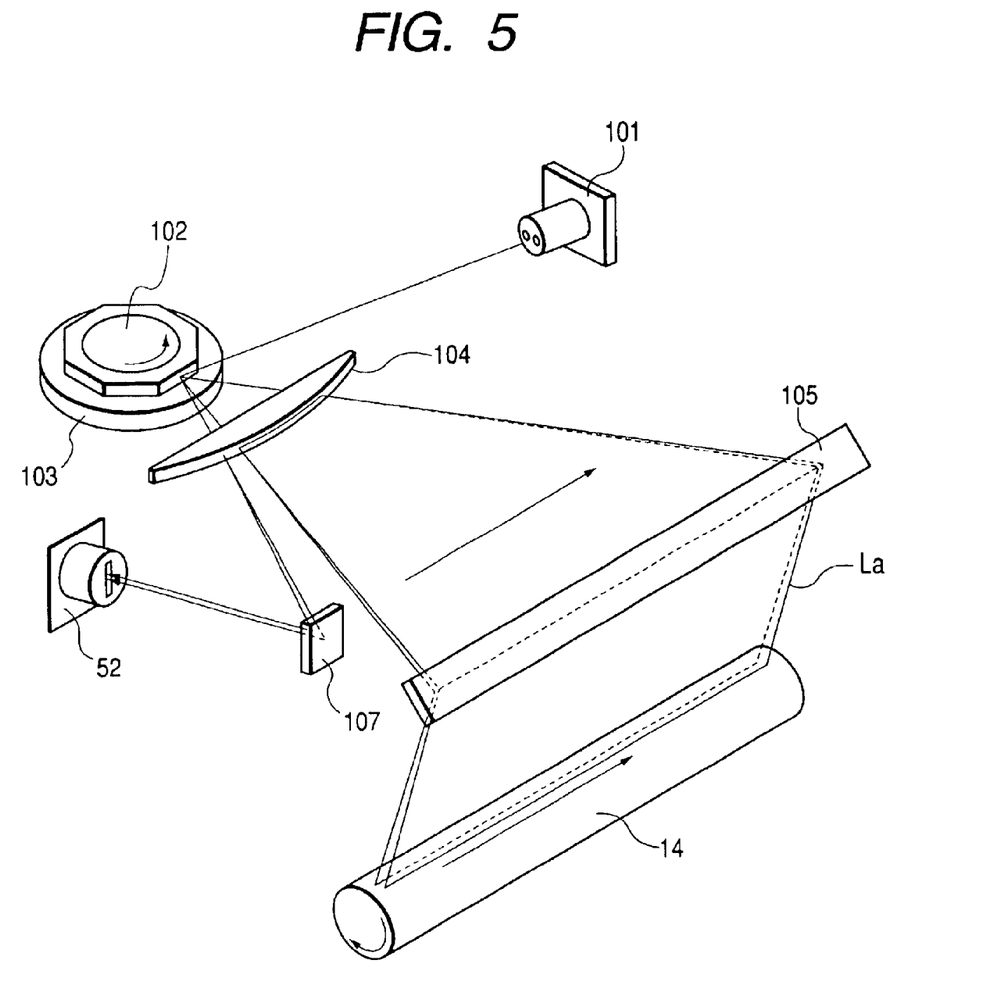
FIG. 5 is a view showing the constituent arrangement of a laser unit 17 and its peripheral portion in the image forming apparatus shown in FIG. 1.

The laser unit 17 and the like in the image forming apparatus 1 will be described with reference to FIG. 5. FIG. 5 is a view showing the laser unit 17 and its related arrangement.

The laser unit 17 converts digital data generated by the controller 12 into a light beam, and scans the light beam for exposure to form a latent image according to the digital data.

The laser unit 17 has a laser-emitting portion 101, a polygon mirror 102, a polygon motor 103 for rotating the polygon mirror 102, an imaging lens 104, a reflecting mirror 105, and a BD reflecting mirror 107 for reflecting a laser beam from the laser-emitting portion 101 to the beam detection sensor 52. A laser beam reflected by the reflecting mirror 105 exposes and scans the photosensitive drum 14 to form a latent image on the photosensitive drum 14.

At the laser-emitting portion 101, a semiconductor laser source having two light-emitting portions arranged with a distance of 80 μm is arranged with a tilt so that the scanning line interval between two laser beams has a predetermined value on the photosensitive drum 14.

Figure 6:
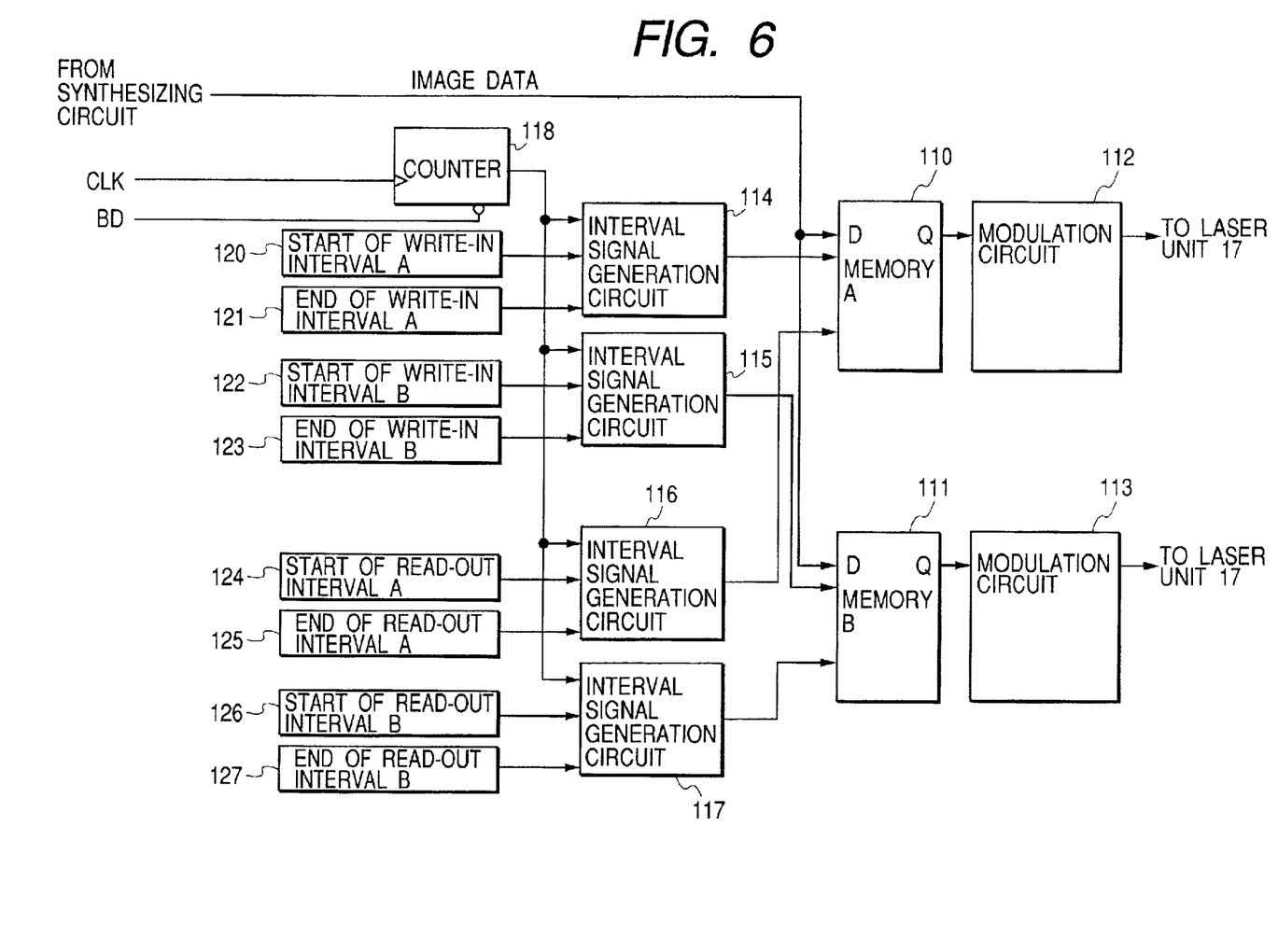
FIG. 6 is a block diagram showing the detailed arrangement of a data conversion circuit 60 in the image processing part shown in FIG. 2.

The data conversion circuit 60 of the image processing part 42 will be explained with reference to FIG. 6. FIG. 6 is a block diagram showing the detailed arrangement of the data conversion circuit 60.

In FIG. 6, digital data output from the synthesizing circuit 58 is input to a memory A 110 and memory B 111. This digital data is written in the memory A 110 in accordance with a write-in interval A signal generated by an interval signal generation circuit 114 on the basis of a BD signal generated by the beam detection sensor 52, and is written in the memory B 111 in accordance with a write-in interval B signal generated by an interval signal generation circuit 115.

A counter 118 is cleared by the BD signal generated by the beam detection sensor 52, and supplies a counter value to the interval signal generation circuits 114 and 115, and interval signal generation circuits 116 and 117.

The interval signal generation circuit 114 changes the write-in interval A signal to "H" when the counter value output from the counter 118 becomes equal to or larger than "start of write-in interval A" data 120 set by the CPU 38, and to "L" when the counter value becomes equal to or larger than similarly set "end of write-in interval A" data 121.

The interval signal generation circuit 115 changes the write-in interval B signal to "H" when the counter value output from the counter 118 becomes equal to or larger than "start of write-in interval B" data 122 set by the CPU 38, and to "L" when the counter value becomes equal to or larger than similarly set "end of write-in interval B" data 123.

The interval signal generation circuit 116 changes a read-out interval A signal to "H" when the counter value output from the counter 118 becomes equal to or larger than "start of read-out interval A" data 124 set by the CPU 38, and to "L" when the counter value becomes equal to or larger than similarly set "end of read-out interval A" data 125.

The interval signal generation circuit 117 changes a read-out interval B signal to "H" when the counter value output from the counter 118 becomes equal to or larger than "start of read-out interval B" data 126 set by the CPU 38, and to "L" when the counter value becomes equal to or larger than similarly set "end of read-out interval B" data 127.

The CPU 38 sets the interval data 120 to 127 so as to satisfy the following relations:

End Data of Write-In Interval A ≧ End Data of Read-Out Interval A

Start Data of Write-In Interval B < Start Data of Read-Out Interval B

End Data of Write-In Interval A ≦ Start Data of Write-In Interval B

Figure 7:
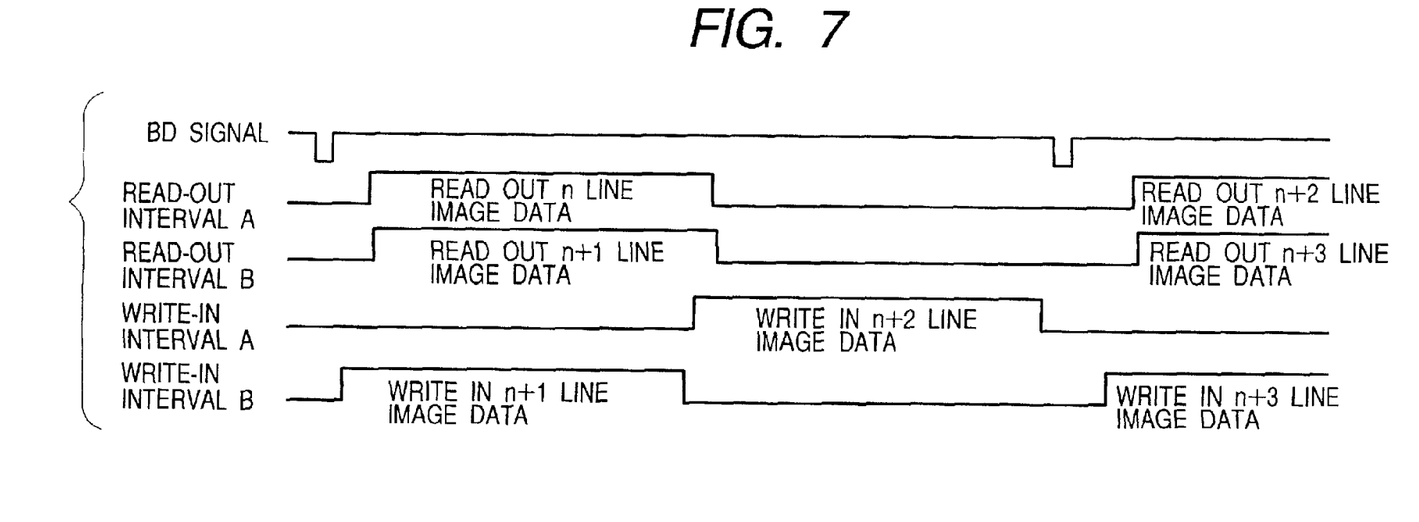
FIG. 7 is a timing chart showing the operation of the data conversion circuit 60 shown in FIG. 6.

The timings of respective signals output from the timing generation circuit 114 will be explained with reference to FIG. 7. Signals other than the BD signal are enabled at "H" level in which data is read out/written from/in the memory A 110 and memory B 111. An "L"-level BD signal represents that a light beam emitted by the laser-emitting portion 101 has entered the beam detection sensor 52.

After the BD signal changes to "L" level, the read-out interval A signal and read-out interval B signal change to "H" level at a predetermined timing for forming an image on the recording sheet P. Then, supply of digital data corresponding to two light beams starts.

The leading edge of the write-in interval A signal is controlled such that the trailing edge of the write-in interval A signal coincides with or delays from the trailing edge of the read-out interval A signal. The write-in interval A signal executes write-in of digital data read out from the memory A 110 by the read-out interval A signal upon the reception of the next BD signal.

Write-in of a first light beam image signal in the memory A 110 starts before a first light beam image signal for previous scanning is completely read out from the memory A 110.

The write-in interval B signal is controlled such that the leading edge of the write-in interval B signal is earlier than the leading edge of the read-out interval B signal upon the reception of the next BD signal, and that the trailing edge of the write-in interval B signal has an enabled duration which does not overlap that of the write-in interval A signal. Digital data read out from the memory B 111 by the read-out interval B signal upon the reception of the BD signal is written.

Write-in of a second light beam image signal in the memory B 111 starts after a second light beam image signal for previous scanning is completely read out from the memory B 111.

In the above embodiment, the write-in and read-out clocks to the memory A 110 and memory B 111 are the same. Even when the write-in clock is higher in frequency than the read-out clock, the same effects can also be realized by the same operation except for shorter interval widths of the write-in interval A signal and write-in interval B signal.

This embodiment adopts a memory control means which ends write-in of the first beam image signal simultaneously with or upon a delay from the end of read-out of the first beam image signal, and starts write-in of the second beam image signal earlier than the start of read-in of the second beam image signal. The embodiment can, therefore, implement an image forming apparatus which can be controlled by the same method as image signal generation using a single beam and can attain a low-cost arrangement.

As has been described above, the present invention can provide an image forming apparatus and image forming method capable of achieving a simple, low-cost arrangement by controlling memory write-in/read-out similarly to image signal generation using a single beam even when an image is formed using a plurality of light beams.

It is to be understood that the form of the invention herein shown and described is to be taken as a preferred example of the same and that various changes in the shape size and arrangement of parts may be resorted to without departing from the spirit of my invention or the scope of the subjoined claims.

What is claimed is:

1. An image forming apparatus comprising:

scanning means for scanning a photosensitive member with a first light beam and a second light beam;

a first memory for storing an image signal for modulating the first light beam;

a second memory for storing an image signal for modulating the second light beam; and memory control means for starting writing an image signal for a first light beam in said first memory before an image signal for a first light beam for previous scanning is completely read out from said first memory, and starting writing an image signal for a second light beam in said second memory after an image signal for a second light beam for previous scanning is read out from said second memory.

2. An apparatus according to claim 1, wherein said memory control means controls the memory write-in so as not to simultaneously execute the write-in of said image signal for a first light beam and the write-in of said image signal for a second light beam.

3. A memory write-in control method for an image forming apparatus having scanning means for scanning a photosensitive member with a first light beam and a second light beam, a first memory for storing an image signal for modulating the first light beam, and a second memory for storing an image signal for modulating the second light beam, comprising the steps of:

starting write-in of an image signal for a first light beam in the first memory before an image signal for a first light beam for previous scanning is completely read out from the first memory; and starting write-in of an image signal for a second light beam in the second memory after an image signal for a second light beam for previous scanning is read out from the second memory.

4. A method according to claim 3, wherein the first light beam image signal write-in step and the second light beam image signal write-in step are not simultaneously executed.

* * * * *